(12) United States Patent
Min et al.

(10) Patent No.: US 9,313,045 B2
(45) Date of Patent: Apr. 12, 2016

(54) SYSTEM AND METHOD FOR PROVIDING AVATAR WITH VARIABLE APPEARANCE

(75) Inventors: Young Joo Min, Seongnam (KR); Young Hoon Jung, Seongnam (KR)

(73) Assignee: NHN Corporation, Seongnam-si (KR)

( * ) Notice: Subject to any disclaimer, the term of this patent is extended or adjusted under 35 U.S.C. 154(b) by 1763 days.

(21) Appl. No.: 11/910,961

(22) PCT Filed: Apr. 7, 2006

(86) PCT No.: PCT/KR2006/001282
§ 371 (c)(1),
(2), (4) Date: Oct. 8, 2007

(87) PCT Pub. No.: WO2006/107182
PCT Pub. Date: Oct. 12, 2006

(65) Prior Publication Data
US 2008/0195699 A1    Aug. 14, 2008

(30) Foreign Application Priority Data
Apr. 8, 2005    (KR) .................... 10-2005-0029315

(51) Int. Cl.
H04L 12/58    (2006.01)
H04L 12/18    (2006.01)
H04L 29/06    (2006.01)

(52) U.S. Cl.
CPC .......... *H04L 12/581* (2013.01); *H04L 12/1822* (2013.01); *H04L 12/1831* (2013.01); *H04L 67/38* (2013.01)

(58) Field of Classification Search
USPC .................. 709/203; 715/758, 706; 345/419
See application file for complete search history.

(56) References Cited

U.S. PATENT DOCUMENTS 5,736,982 A * 4/1998 Suzuki et al. ................ 715/706
5,880,731 A    3/1999 Liles et al.

(Continued)

FOREIGN PATENT DOCUMENTS

JP     2004-334318    11/2004
KR    10-2001-0064757 A    7/2001

(Continued)

OTHER PUBLICATIONS

International Search Report dated Jul. 18, 2006 in PCT Application PCT/KR2006/001282, which is the international application of this application.

(Continued)

*Primary Examiner* — Khaled Kassim
(74) *Attorney, Agent, or Firm* — Greer Burns & Crain, Ltd.

(57) ABSTRACT

The present invention relates a system and method for providing an avatar with variable appearance. When a user is connected through a network, information on the avatar provided to the user is collected. The avatar has at least two exposed units. The user's location on the network is determined, at least one exposed unit is selected from among the plurality of exposed units according to the determined location, and an avatar for displaying the selected exposed unit is generated to the user. The exposed units configuring the avatar are respectively modified according to the user's selection. Therefore, the avatar can be easily displayed on any place on the Internet by controlling the exposed units of the avatar depending on the user's location on the network. Further, the user can combine and modify the avatar in various ways by respectively controlling the exposed units.

13 Claims, 9 Drawing Sheets

(56) References Cited

U.S. PATENT DOCUMENTS

| | | | |
|---|---|---|---|
| 6,466,213 B2 * | 10/2002 | Bickmore et al. | 345/473 |
| 2002/0080173 A1 * | 6/2002 | Tagami et al. | 345/753 |
| 2004/0221224 A1 * | 11/2004 | Blattner | H04L 12/1822 715/201 |
| 2005/0005247 A1 * | 1/2005 | Kamachi | G06F 3/011 715/804 |
| 2005/0137015 A1 * | 6/2005 | Rogers et al. | 463/42 |
| 2006/0089543 A1 * | 4/2006 | Kim | A61B 5/00 600/300 |
| 2007/0002057 A1 * | 1/2007 | Danzig | A63F 13/12 345/473 |
| 2007/0113181 A1 * | 5/2007 | Blattner | G06F 3/011 715/706 |
| 2009/0144173 A1 * | 6/2009 | Mo | G06N 3/006 705/26.1 |

FOREIGN PATENT DOCUMENTS

| | | |
|---|---|---|
| KR | 10-2002-0070754 A | 9/2002 |
| KR | 10-2002-0074138 A | 9/2002 |
| KR | 10-2004-0013336 A | 2/2004 |
| KR | 10-2004-0026029 A | 3/2004 |

OTHER PUBLICATIONS

Office action dated Jun. 16, 2006 in corresponding Korean Patent Application No. 10-2005-0029315, which is the priority application of the above-referenced application.

"Completely Master Software for People who did not sufficiently use" published in YOMIURI PC on Nov. 1, 2002, p. 46-49.

"Completely Master Software for Those who did not sufficiently use" published in YOMIURI PC on Oct. 29, 2002, p. 104-107.

* cited by examiner

FIG. 8
[Name] Title of Mini-Homepage
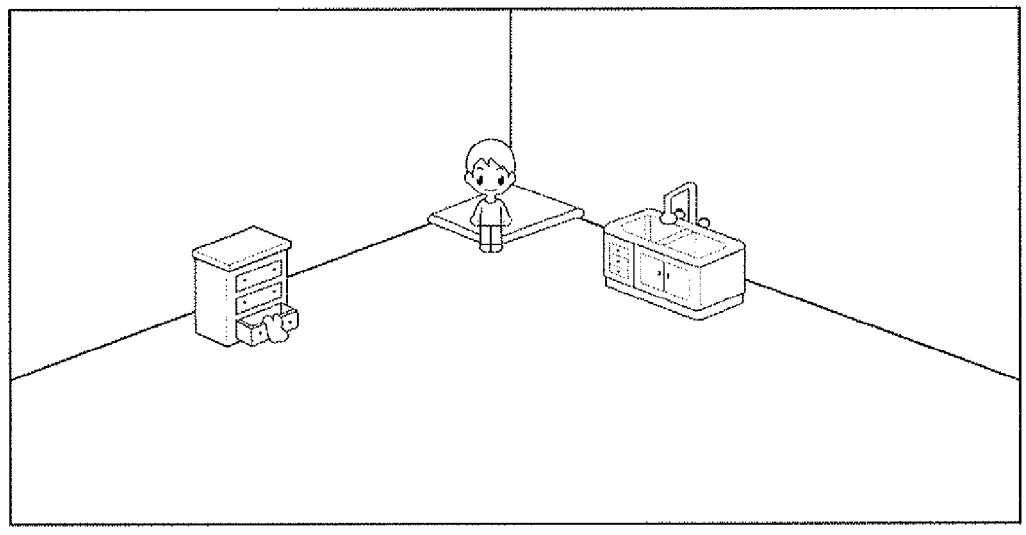
Reset | Undo | Input Balloon | Store Mini-Homepage
Decorate Avatar | Change Avatar
Head/Body
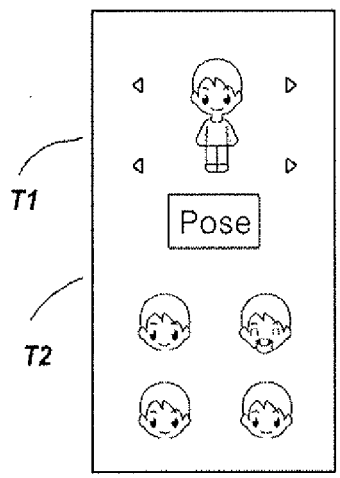
T1
T2

FIG. 9
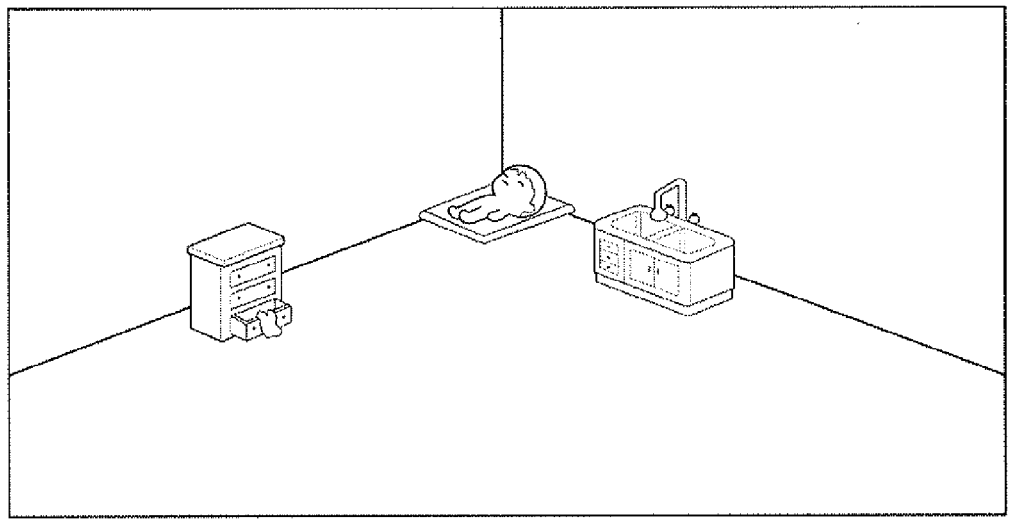
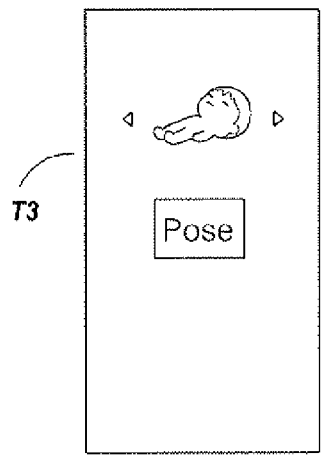

SYSTEM AND METHOD FOR PROVIDING AVATAR WITH VARIABLE APPEARANCE

TECHNICAL FIELD

The present invention relates to an avatar providing system and method thereof. More particularly, the present invention relates to a system and method for providing avatars to users on a network such as the Internet.

BACKGROUND ART

As usage of the Internet has substantially increased, electronic commerce for people all over the world has been performed through the Internet, communication between users has gradually been developed, and very varied types of communication have been executed through the Internet.

Internet telephones as substitutes for cable telephones are now available, in addition to the electronic mail and file transmission that are the basic communication forms, and short messages can be transmitted to cellular phones using the Internet. Also, a chat service that is a communication between many users can be performed on the Internet, and a voice chat service or a video chat service can be performed through the Internet in addition to the text-based chat service.

Netizens, during the execution of the communication, have been charmed by anonymity in cyber space as they fulfill their desires to express themselves, and avatars are now widely used as means for satisfying the two points. The term "avatar" means an incarnation, and it indicates an animation character that represents the user in cyber space.

There is however a limit on expressing various conditions by using the avatar. That is, the currently used avatar generally provides a method for changing items that are additionally provided to the avatar, such as clothes or accessories, according to the user's selection, rather than changing the avatar. However, users have desired to express their unique features or current conditions by modifying the avatar in various manners, but modification of the avatar is mainly allowed only in the additional items so that various avatar modifications are not provided. Also, users can only select an avatar that has facial expressions and poses provided by the system, and they cannot combine an avatar that has various facial expressions and poses according to their intention.

Also, many users desire to show themselves while posting contents on the bulletin boards or data rooms in the communities, such as cafes or blogs, but what is permitted is only to display user IDs or nicknames in text format since it is not easy to concurrently display avatars of many users because of the avatar's multi-layer structure and large volume of data.

Further, it is difficult to expose the avatar at any location of a web page because of its multi-layer structure and large volume of data.

The above information disclosed in this Background section is only for enhancement of understanding of the background of the invention and therefore it may contain information that does not form the prior art that is already known in this country to a person of ordinary skill in the art.

DISCLOSURE

Technical Problem

It is an advantage of the present invention to provide a means for identifying a user in cooperation with the user's movement to any location on the Internet. In particular, it is an advantage of the present invention to easily display user identifying means anywhere on the Internet by varying exposed units of identifying means depending on the user's location on the Internet.

Also, it is an advantage of the present invention to allow the user to combine and change his avatar in more various manners.

Technical Solution

In one aspect of the present invention, a method for providing an avatar by using an avatar providing server and a service providing server in a system connected to a user terminal through a network includes: a) the avatar providing server providing an avatar to the user, who is connected through the network, according to the user's requests and storing the provided history; b) the service providing server, when the user is connected, receiving information on the avatar provided by the avatar providing server to the user, the information being information on a plurality of exposed units configuring the avatar; c) the service providing server determining the user's location on the network; d) the service providing server selecting information on at least one exposed unit from among the information that is transmitted according to the determined location; and e) the service providing server generating a service page on which the avatar having a controlled exposed unit is displayed based on the selected information, and transmitting the service page to the user terminal.

In another aspect of the present invention, a method for providing an avatar by using an avatar providing server and a service providing server in a system connected to a user terminal through a network includes: a) the avatar providing server providing the avatar to the user, who is connected through the network, according to requests by the user and storing the provided history; b) the service providing server requesting the user's avatar information from the avatar providing server when the user is connected; c) the avatar providing server determining the user's location on the network; d) the avatar providing server selecting at least one exposed unit from among the exposed units configuring the user's avatar according to the determined location, and providing corresponding information to the service providing server; and e) the service providing server generating a service page on which the avatar having a controlled exposed unit is displayed based on the transmitted information, and transmitting the service page to the user terminal.

In another aspect of the present invention, a method for providing an avatar for a system connected to a user terminal through a network includes: a) the system displaying an avatar that is provided to the user, who is connected through the network, the avatar including a first exposed unit that corresponds to the head and a second exposed unit that has parts other than the head; b) the system providing an avatar modifying means to the user terminal according to the user's request; c) the system determining the user's operation state of the avatar modifying means; d) the system respectively modifying and controlling the first exposed unit configuring the avatar based on a first modifying variable that is established according to the determined operation state of the avatar modifying means; e) the system respectively modifying and controlling the second exposed unit configuring the avatar based on a second modifying variable that is established according to the determined operation state of the avatar modifying means; and f) the system generating and displaying the avatar by combining the first exposed unit and the second exposed unit that are respectively modified and controlled.

In another aspect of the present invention, a system for providing an avatar connected to a user terminal through a network includes: a provision history database for storing information on the avatars assigned to users; an avatar display for collecting information on the avatar assigned to the user from the provision history database and displaying the information when the user is connected through the network; and a user position determiner for determining the user's location on the network, wherein the avatar includes a plurality of exposed units, and the avatar display selects at least one of the exposed units configuring the avatar according to the determined location and displays the exposed unit of the selected avatar.

DESCRIPTION OF DRAWINGS

FIG. 8 and FIG. 9 show an avatar changing screen according to an embodiment of the present invention.

BEST MODE

Figure 1:
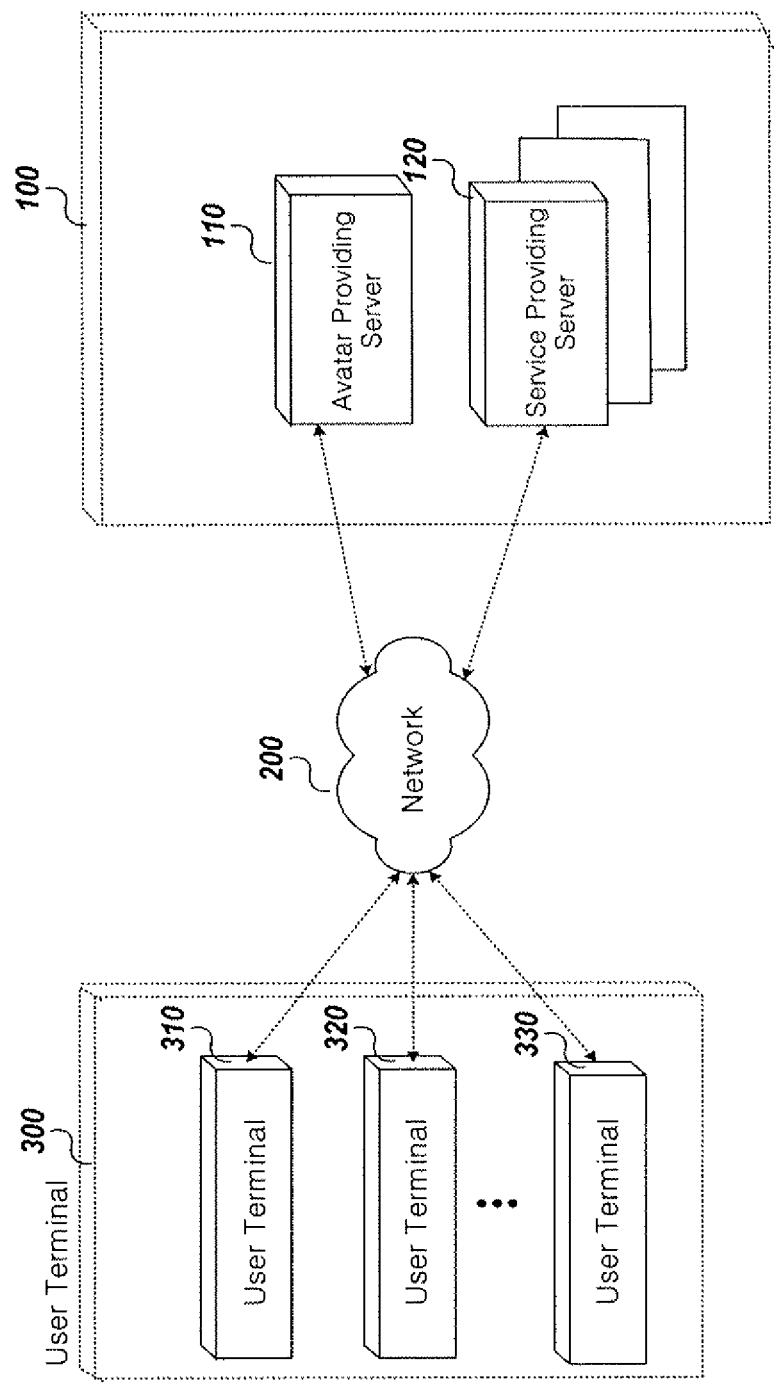
FIG. 1 shows an avatar providing system according to an embodiment of the present invention.

Exemplary embodiments of the present invention will hereinafter be described in detail with reference to the accompanying drawings. As those skilled in the art would realize, the described embodiments may be modified in various different ways, all without departing from the spirit or scope of the present invention.

Proper identification means are provided to respective users in the embodiments. In this instance, the proper identification means are cooperated with ID codes (e.g., IDs) assigned to users and a plurality of proper identification means may be assigned to each user. The users may receive the proper identification means according to predefined behaviors, such as making a purchase and joining an event. It will be exemplified that an identification means is assigned to a user, and in addition to this, it is possible that a plurality of identification means can be assigned to the user, and in this instance, a single identification means selected by the user can be established and used as a representative one. For better comprehension and ease of description, the identification means according to the present invention will be referred to as an "avatar" but can also be referred to by other names.

In the present invention, the avatar can be displayed in cooperation with the user's ID code when the user moves to any place on the Internet, and for this purpose, the avatar is divided into at least two parts, and one of the two parts of the avatar is selected and displayed depending on the user's location on the Internet. That is, the displayed part of the avatar is varied depending on the user's location on the Internet.

In further detail, the avatar has a multi-layered structure and its data capacity is large, and hence, it is difficult to provide the avatar at some locations (e.g., a notice board). Therefore, in the embodiments of the present invention, a predetermined part of the corresponding avatar is selected and displayed when it is difficult to display the whole avatar. As a result, the corresponding whole avatar is displayed at the location where the whole avatar can be displayed with a large data amount, and a predetermined part of the corresponding avatar is displayed at the location where the same can be displayed with a small data amount so that the user can display himself by using a single avatar at any location without receiving another avatar for each location and system.

Also, respective parts of the avatar are modifiable by the user's selection in the embodiments of the present invention. That is, the user can individually request to modify respective parts of the avatar, and the modified item is applied to the corresponding part of the avatar according to the request. The respective parts that configure the avatar will be referred to as exposed units for ease of description. In the below embodiments, the avatar will be divided into a first exposed unit and a second exposed unit, the first exposed unit will be set to be the head of the avatar and the second exposed unit will be set to be other parts excluding the head of the avatar, although other embodiments are possible. That is, the avatar can be divided into at least three exposed units, and the parts corresponding to the exposed units are not restricted to the above description.

FIG. 1 shows an avatar providing system according to an embodiment of the present invention.

As shown in FIG. 1, the avatar providing system 100 is connected to a plurality of user terminals 300 through a network 200 (including a telephone network, the Internet, and a wireless communication network).

The user terminal 300 is a communication device for accessing the avatar providing system 100 through the network 200, and for example, the user terminal 300 includes a cable telephone, a wireless communication terminal, a computer, and an Internet TV. Therefore, the user can conveniently and quickly access the avatar providing system 100 by using a PC communication, the Internet or wireless Internet, and a telephone network.

The avatar providing system 100, which is connected to the user terminal 300 and provides avatars to a plurality of users, includes an avatar providing server 110, and can further include a service providing server 120 for providing a plurality of services to the users.

Figure 2:
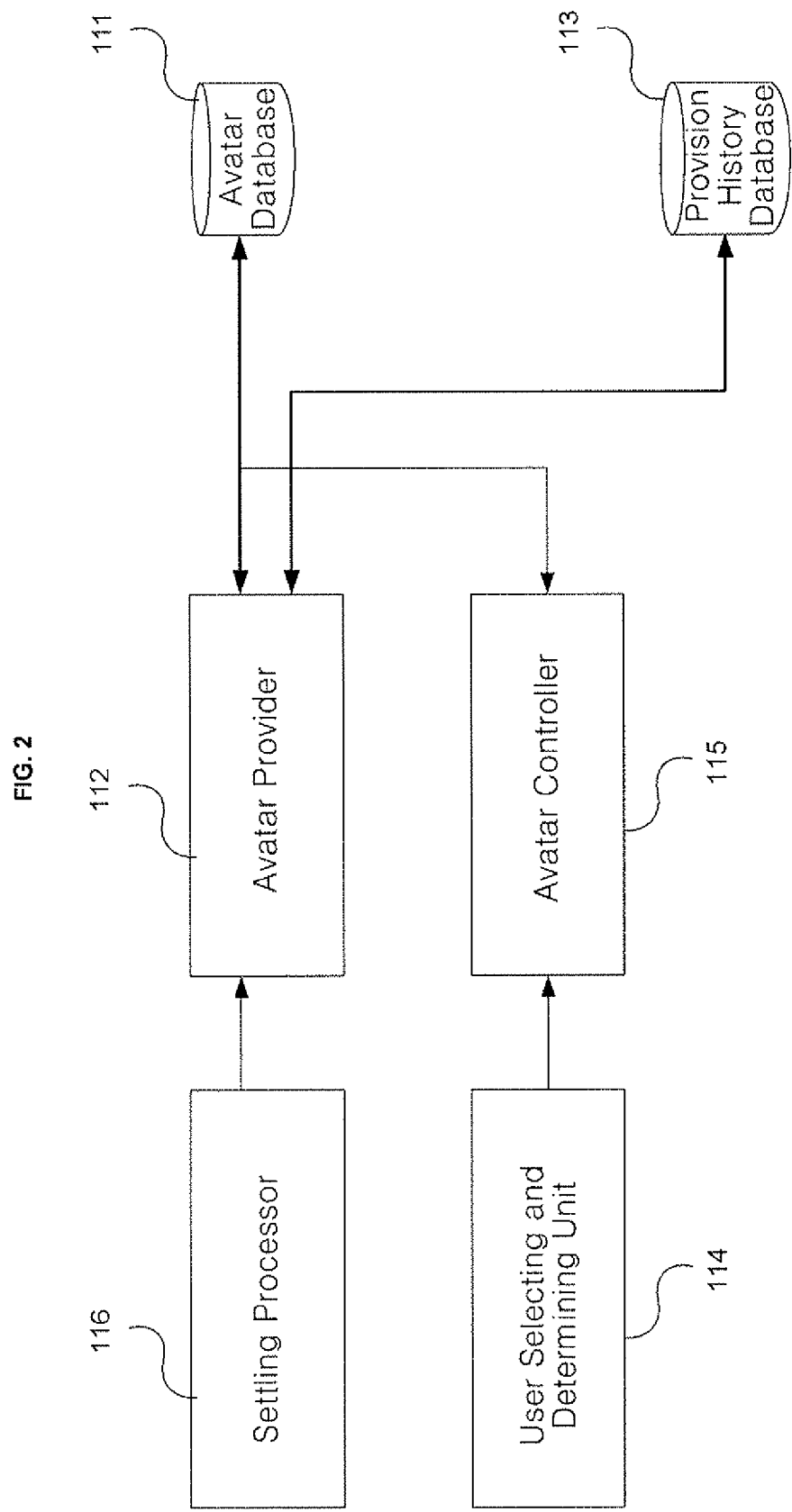
FIG. 2 shows the avatar providing server of FIG. 1.

FIG. 2 shows a detailed avatar providing server.

The avatar providing server 110 provides avatars to users, and for this purpose, as shown in FIG. 2, it includes an avatar database 111 for storing data files on a plurality of avatars provided by the system (referred to as avatar files hereinafter), an avatar provider 112 for providing avatars to the users, a provision history database 113 for storing information on the avatars provided to the respective users, a user selecting and determining unit 114, an avatar controller 115 for modifying and combining the avatar according to the user's selection, and a settling processor 116.

The avatar database 111 stores avatar files corresponding to avatar ID codes, and in particular, it stores files that correspond to respective exposed units of the avatar corresponding to the avatar ID code. For example, the avatar database 111 stores file lists corresponding to the respective exposed units configuring the avatar. The file lists corresponding to the exposed units include as many files as the number of modifying variables of the corresponding exposed units provided by the system, and the respective files are data for displaying the exposed units of the avatar to which the modifying items are applied according to the modifying variables. Therefore, when the user selects a modifying variable for a predetermined exposed unit of the avatar, the avatar controller 115 configures the avatar based on the file that corresponds to the selected modifying variable and provides the avatar to the user.

The modifying variables for the exposed units of the avatar according to the embodiment of the present invention are as follow. Modifying variables for the first exposed unit corresponding to the head of the avatar include viewing direction, facial expression, and color, and the modifying variables for the second exposed unit corresponding to parts other than the head include motion changes of the avatar, including poses such as sitting, standing, or lying, and directions. In addition, a plurality of variables for modifying the respective exposed units can be used.

The above-noted avatars can be classified and stored by a plurality of categories, and descriptions and generation dates of the corresponding avatars can be additionally stored.

The avatar provider 112 provides avatars to the users and can provide an avatar (or an avatar-related item) to the user when he makes a purchase. For this purpose, the avatar provider 112 provides avatars that are sold to the users having accessed the system 100, settles the avatar selected by the user in cooperation with the settlement processor 116, allocates the selected avatar to the user, and stores the allocation history in the provision history database 113. Also, the avatar provider 112 can provide a predetermined avatar to the user who won an event when the system 100 generated the event.

Therefore, the provision history database 113 stores information on the avatar received by the user when he made a purchase or joined an event corresponding to the user's ID code. For example, the provision history database 113 can store the avatar file provided to the user corresponding to the user's ID code. In addition, the provision history database 113 can store the avatar ID code of the provided avatar, and in this instance, it can store path information for indicating where the provided avatar is stored in the avatar database 111.

The settling processor 116 settles the avatar purchased by the user by using various types of settlement means (cash, credit card, or cyber money).

The avatar controller 115 controls the avatar according to the user's selection of the modifying variable. For this purpose, the user selecting and determining unit 114 provides means for modifying the respective exposed units of the avatars of the users to the users having accessed the Internet, and transmits the modifying variables that are established according to the users' manipulation of the means to the avatar controller 115. The avatar controller 115 reads the files that correspond to the selected modifying variables from the avatar database 111, combines them, and provides them to the user.

Figure 3:
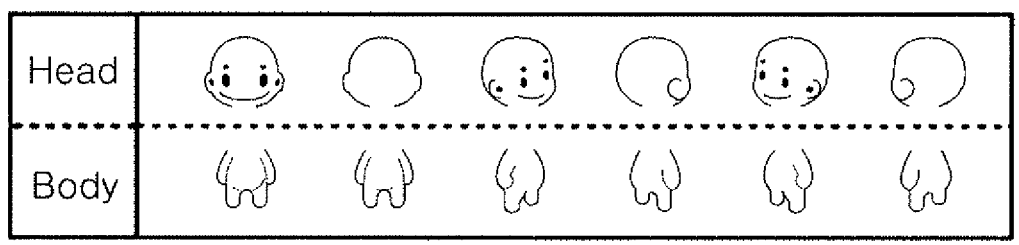
FIG. 3 and FIG. 4 show a set of combining and changing the avatar according to an embodiment of the present invention.
Figure 4:
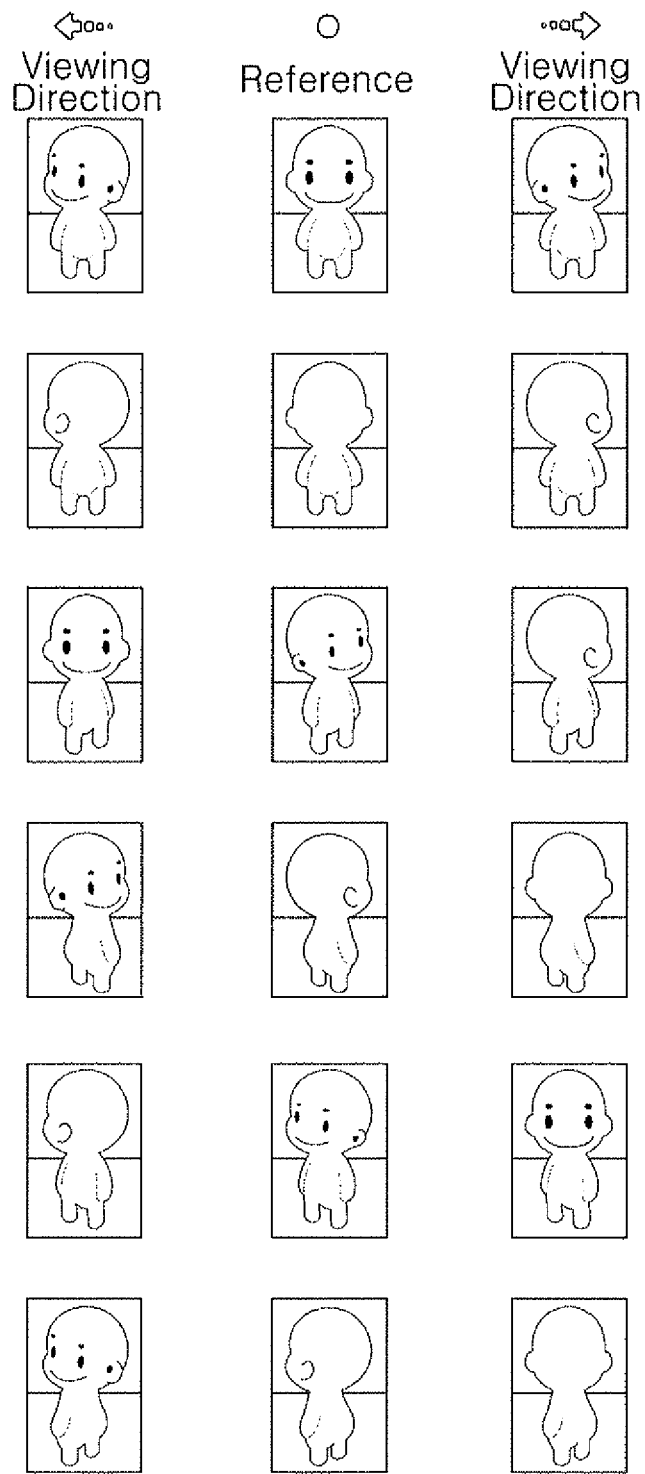

FIG. 3 and FIG. 4 show combinations of the avatar according to an embodiment of the present invention. FIG. 3 shows combinations of the avatar according to the embodiment of the present invention, and FIG. 4 shows avatars that can be combined based on the configuration shown in FIG. 3

As shown in FIG. 3, an avatar according to the embodiment of the present invention can be divided into a first exposed unit (the head) and a second exposed unit (the body that includes human parts other than the head), and the respective exposed units are variable according to the modifying variables, such as direction, pose, and facial expression. FIG. 3 shows variations of the first exposed unit according to viewing directions, and shows variations of the second exposed unit according to pose directions. Therefore, the avatar database 111 stores files that correspond to the exposed units of the avatar to which a predetermined modifying variable is applied.

Since various modifications are allowable to the exposed units as described above, various types of avatar combination are allowed by the combination of the modified exposed units. That is, as shown in FIG. 4, avatars having various poses and viewing directions can be generated by combining different files following the viewing direction of the first exposed unit and the pose direction of the second exposed unit.

As described above, the avatar controller 115 selectively combines a first exposed unit and a second exposed unit from among the files that correspond to the pluralities of first and second exposed units according to the modifying variable selected by the user to thereby generate a corresponding avatar.

The service providing server 120 provides avatars to the accessing users in linkage with the ID codes in cooperation with the avatar providing server 110. In this instance, to provide avatars to the user in cooperation with the ID codes means to display and provide the user's avatar in all areas in which the user's ID code is displayed when the user logs in to the system.

In the subsequent embodiment, it will be described to provide an ID code based avatar service in cooperation with the avatar providing server 110 by exemplifying the service providing server 120 as a community server for providing various community services to the users. However, the service providing server may include other types of servers for providing predetermined services to the users when they log in to the system, in addition to the server for providing the community service.

In this instance, the community can be any type of community that may be generated on the network. For example, the community includes a personal community (e.g., blog, personal homepage, mini homepage, and profile) that a person manages and in which he posts contents including his documents or opinions, and a shared community (e.g., cafe and club) to which a plurality of users register themselves and communicate documents or opinions for the same topics. In this instance, it will be exemplified that the service providing server 120 provides a personal community service.

Figure 5:
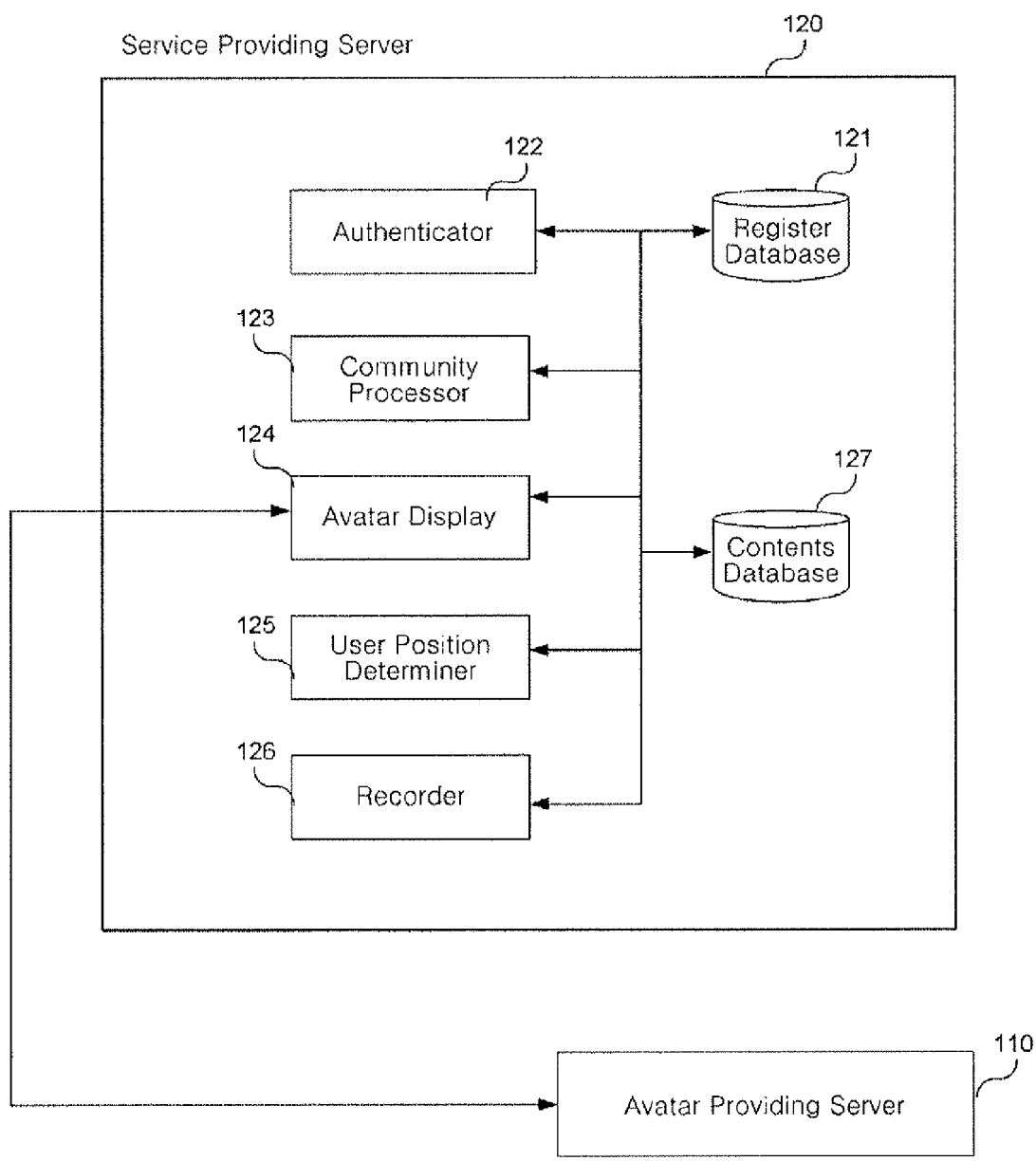
FIG. 5 shows the service providing server of FIG. 1.

FIG. 5 shows a service providing server according to an embodiment of the present invention.

The service providing server 120, as shown in FIG. 5, includes a register database 121 for storing general information on the respective communities; an authenticator 122 for performing a log-in process; a community processor 123 for forming communities, and posting, providing, modifying, and editing contents to thus perform contents related tasks; an avatar display 124; a user position determiner 125; a recorder 126; and a contents database 127 for storing contents that are posted in the respective communities.

The register database 121 stores brief information on the registered communities. For example, the register database 121 stores ID codes of the communities that are registered by categories, and it stores community information including a community name, an ID, or a nickname of the user having generated the community, and a registration day for each community ID code. The register database 121 can additionally store information (e.g., IDs) on the users who are registered as members in the case of the shared community.

The contents database 127 stores information on the contents provided to the respective communities. For example, when the personal community according to the present invention is a mini homepage, the contents database 127 stores items and contents configuring the corresponding mini homepage.

The community processor 123 generates and registers communities, and posts and manages contents for the respective communities.

The avatar display 124 communicates with the avatar providing server 110 to receive avatar information on the logged-in user and displays the same at a predetermined location of the community. In particular, the avatar display 124 provides different exposed units of the avatar of the user depending on the user's location on the Internet. For this purpose, the user position determiner 125 determines to which location of the Internet the user having requested the avatar is connected, and the avatar display 124 displays the first exposed unit or the second exposed unit of the avatar of the user or displays the first and second exposed units.

In this instance, the user's location can be areas in which the user's ID code is displayed, and for example, it displays a page for displaying the avatar. The page can be classified as a first page for displaying the whole avatar and a second page that has difficulty in processing data for displaying the whole avatar. The first page includes a web page to which the user is connected after logging in and the user's personal community page, and the second page includes a notice board web page and other users' personal community pages. The avatar display 124 displays the first and second exposed units of the avatar of the corresponding user to be displayed on the corresponding web page when the user location is determined to be the first page, and it displays the first exposed unit of the avatar when the user location is determined to be the second page. For example, the avatar display 124 displays the whole avatar at a place where an ID code, such as the user's ID or nickname, is displayed in a personal community, such as a blog or a mini homepage, so that the user's proper features, emotion, or feeling may be expressed. Also, when the user uploads an article or answers to a question in a community, such as a cafe, or when the user accesses another user's blog or mini homepage to leave a visit message, the avatar display 124 displays the first exposed unit of the avatar of the corresponding user at a place where the user's ID code, such as an ID or a nickname, is displayed so that the user's features, emotions or feeling may be displayed.

The recorder 126 stores corresponding community data together with a modified avatar when the user accesses a predetermined community and modifies the avatar. For example, when the user accesses a mini homepage to modify the avatar, the recorder 126 stores information on the mini homepage together with the file on the finally modified avatar so that the mini homepage and the corresponding avatar may be displayed without referring to the database according to communication with the avatar providing server 110 when the user again accesses the same.

The avatar providing server 110 mainly provides the avatar to the user in the embodiment of the present invention, and in addition to this, the service providing server 120 can provide the avatar to the user in cooperation with the avatar providing server 110. That is, the user can access the service providing server 120 as well as the avatar providing server 110 to receive an avatar according to a purchase.

The avatar providing system 100 according to the embodiment of the present invention can further include an interface server for an interface between the respective servers and the terminal so as to process the user's system access, in addition to the above-described avatar providing server 110 and the service providing server 120.

The respective components of the respective servers 110 and 120 are illustrated to be operable in the corresponding server in the embodiment of the present invention, and in addition to this, the same can be realized to be respective individual servers to perform corresponding functions, and the databases can be classified in other ways. Further, the avatar providing server 110 and the service providing server 120 can be realized to be separate systems, and the service providing server 120 can be realized to include the avatar providing server 110.

An avatar providing method according to an embodiment of the present invention will now be described.

When attempting to express themselves with means other than the ID codes such as the IDs, users can receive a predetermined avatar from the avatar providing server 110, and can express themselves by using the avatar when they use various services provided by the service providing server.

For this purpose, the users access the avatar providing system 100 and receive avatars.

In order to receive the avatar, the user must receive a predetermined ID code that is an ID from the avatar providing system 100, and the user accesses the avatar providing server 110 or the service providing server 120 to receive an avatar.

When the user having received the ID from the system 100 accesses the avatar providing server 110 to request purchase of an avatar, the avatar provider 112 of the avatar providing server 110 reads information on the avatar for sale from the avatar database 111 to generate a product page and provide the product page to the user.

When the user selects a predetermined avatar on the product page and requests to make a purchase, the settling processor 116 settles the avatar by using settlement means (e.g., credit card, cash, or cyber money) provided by the user. The settlement process will not be described since it is well known to a skilled person.

When the settlement is finished, the avatar provider 112 records information on the avatar bought by the user in the provision history database 113, in correspondence to the user ID. In this instance, the avatar provider 112 can store the ID code of the corresponding avatar, or can store the corresponding avatar file. The avatar file is a file generated by applying various items (e.g., clothes, accessories, hats, and shoes) for additionally decorating the avatar to the corresponding avatar. The addition of various items to the avatar will not be described.

The user can buy the avatar according to the above-noted method having accessed the service providing server 120 to log in to the system.

A process for displaying the avatar when the user uses the avatar to use various services will now be described.

In this instance, it will be described that the user accesses a personal community such as a mini homepage and uses a service.

Figure 6:
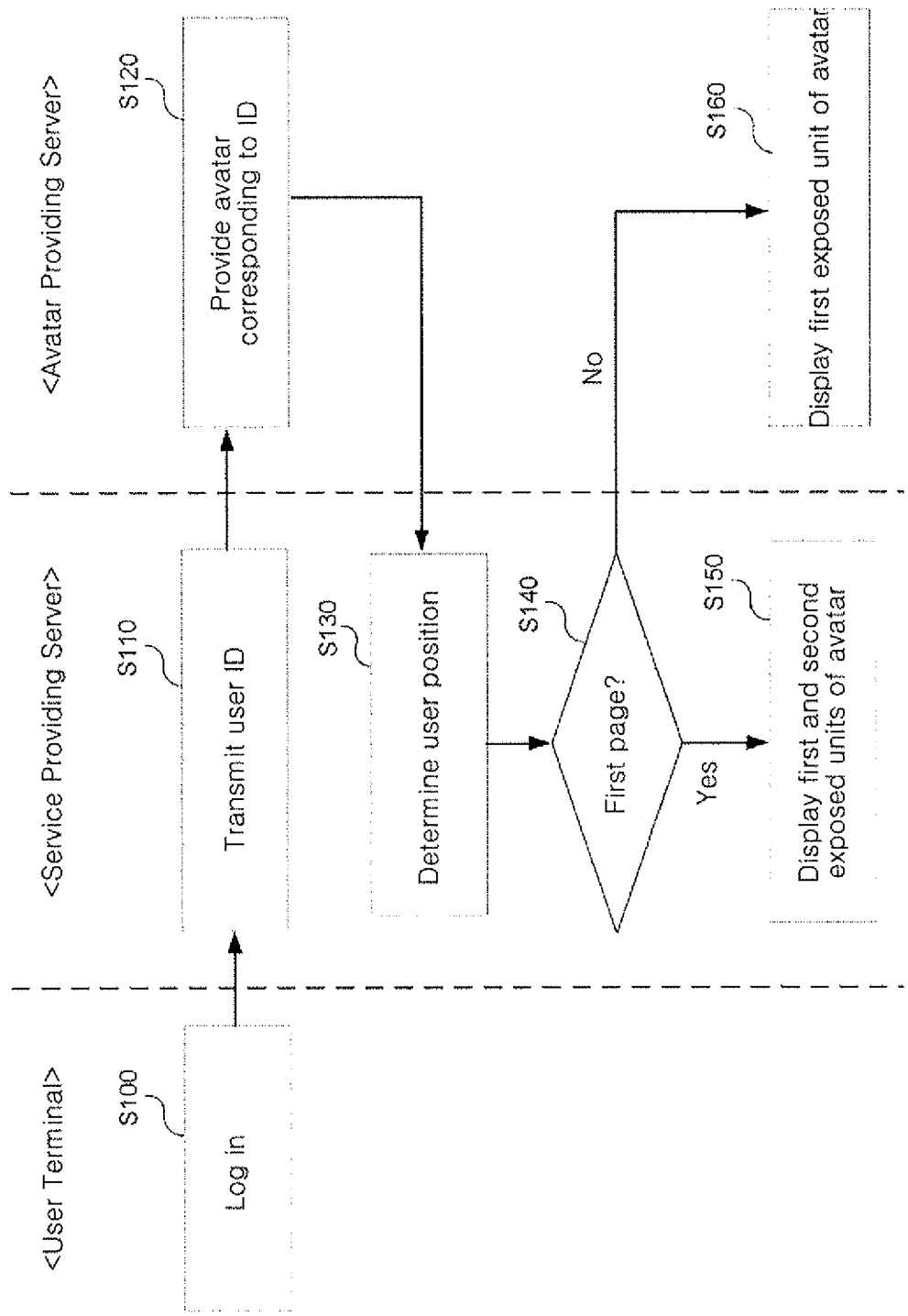
FIG. 6 shows a flowchart for an avatar displaying process according to an embodiment of the present invention.

FIG. 6 shows a process for displaying the avatar in the case of using a service according to an embodiment of the present invention.

When the user accesses the service providing server 120, a general log-in process is performed, and when the log-in process is finished, a service page for displaying log-in information of the corresponding user is provided to the user terminal 300. The service page is not a personal community page such as the user's mini homepage, but is a page for displaying a plurality of services provided by the service providing server. For example, when the user logs in to the system from his mini homepage, the service page is initially displayed to display information on other users' mini homepages.

In this instance, the avatar display 124 of the service providing server 120 communicates with the avatar providing server 110 based on the logged-in user's ID code that is his ID, and requests avatar information on the corresponding user in steps S100 and S110.

The avatar provider 112 refers to the provision history database 113 based on the provided user ID to check the avatar allocated to the user. When a predetermined avatar's ID code corresponds to the user ID, the avatar provider 112 brings a corresponding avatar file from the avatar database 111 based on the avatar ID code, and provides the avatar file to the service providing server 120 in step S120. The provision history database 113 can store the file of the avatar provided to the user, and in this case, it transmits the file to the service providing server 120. The avatar file transmitted in this case includes the first and second exposed unit files of the corresponding avatar.

The avatar display 124 of the service providing server 120 controls the exposed portion of the avatar according to the user's current location when the avatar file is provided. In detail, the user position determiner 125 determines the user's current location and transmits corresponding information to the avatar display 124 in step S130. When it is determined that the user is connected to the user's mini homepage or is logged in to the system to be thus located on the first page, the avatar display 124 displays the user's avatar at a predetermined location based on the provided avatar file, that is, the file that is generated by combining the files of the first and second exposed units, in steps S140 and S150. In this instance, the first and second exposed units of the avatar are displayed.

However, when the user is determined to be on the second page because the user is connected to another user's mini homepage to attempt to leave a visit message or to attempt to upload predetermined contents onto the notice board, the avatar display 124 displays the avatar based on the file that corresponds to the first exposed unit from among the first and second exposed unit files configuring the provided avatar file in step S160. In this instance, the head of the avatar is displayed.

As described above, the service providing server 120 displays the whole avatar or part of the avatar according to the user's location, that is, the web page characteristic so that the unique avatar provided to the user can be easily displayed at any location on the Internet.

It is described that the avatar providing server 110 transmits the avatar file to the service providing server 120 and the service providing server 120 determines the user's location and selectively displays the first exposed unit and/or the second exposed units of the avatar, and differing from this, it is also possible that the avatar providing server 110 selectively provides a file for the first exposed unit and/or a file for the second exposed unit of the corresponding avatar file according to the determination of the user's location. That is, when the avatar providing server 110 includes a user position determiner and the user is determined to be located on the first page, files that correspond to the first and second exposed units of the user's avatar file are provided to the service providing server 120, and when the user is determined to be located on the second page, a file that corresponds to the first exposed unit of the avatar file is provided to the service providing server 120. This process can be generated by a person of an ordinary skill in the art based on the embodiment of the present invention, and hence, no detailed description will be provided.

In addition, the user can modify the avatar assigned to the user.

Figure 7:
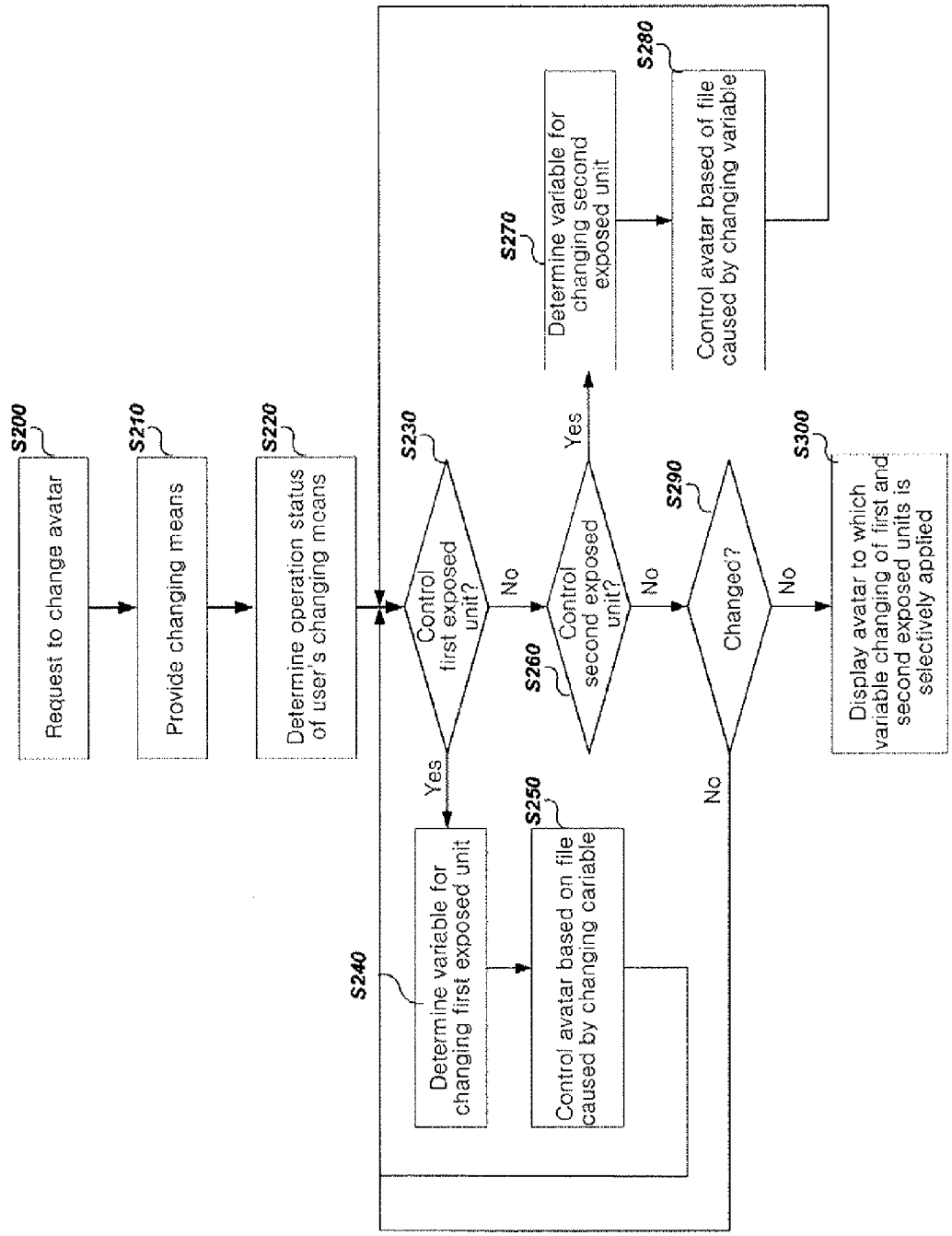
FIG. 7 shows a flowchart for an avatar changing process according to an embodiment of the present invention.

FIG. 7 shows an avatar modifying process according to an embodiment of the present invention.

When the user accesses the system 100 to select a menu for modifying the user's avatar, for example, when the user accesses the service providing server 120 to receive an avatar and then selects a predetermined menu such as "Decorate Avatar," the avatar providing server 110 modifies the avatar depending on the user's selection as follows.

When the user requests to modify the avatar, as shown in FIG. 7, the selecting and determining unit of the avatar providing server 110 provides a changing means for modifying the avatar in steps S200 and S210.

FIG. 8 and FIG. 9 show screens for providing avatar modifying means according to an embodiment of the present invention. FIG. 8 and FIG. 9 show screens when the user accesses a mini homepage to request modification of an avatar. For example, as shown in FIG. 8, a means (T1) for modifying the first exposed unit of the corresponding avatar together with the user's avatar is provided on the bottom of the screen. That is, a plurality of first exposed units of various avatars is displayed and the user selects a desired one therefrom. In this instance, the provided first exposed unit can be generated by variously modifying the avatar's viewing direction and facial expressions.

When the user finishes selection of the first exposed unit of the avatar, a selection button (T2) for modifying the exposed unit in the second exposed unit of the avatar appears, and when the user clicks the selection button (T2), as shown in FIG. 9, a means (T3) for modifying the second exposed unit of the avatar is provided. That is, a plurality of second exposed units of various avatars is displayed and the user selects a desired one therefrom. In this instance, the provided second exposed unit can be generated by variously modifying the avatar's viewing direction and facial expressions.

When the avatar modifying means is provided as described above, the user selecting and determining unit 114 determines the user's operation of the avatar modifying means and transmits a corresponding modifying variable to the avatar controller 115 in step S220. In this instance, the modifying variable includes the first modifying variable of the first exposed unit and/or the second modifying variable of the second exposed unit.

The avatar controller 115 searches the avatar database 111 based on the modifying variable of the first exposed unit and/or the second exposed unit transmitted by the user selecting and determining unit 114, brings and combines the file of the first exposed unit corresponding to the first modifying variable and/or the file of the second exposed unit corresponding to the second modifying variable from among the files that are stored corresponding to the avatar, and thus generates an avatar file to which the first and/or the second modifying variable is applied. Accordingly, the avatar to which the first and/or second modifying variable is generated is displayed on the screen in steps S230 to S280.

The above-noted process can be individually performed in the process for the user to select a modifying variable for the first exposed unit and the process for him to select a modifying variable for the second exposed unit, and when the user selects a predetermined modified exposed unit, the selection is applied to the avatar and is then displayed. Therefore, the user can control the avatar's pose, direction, and facial expression in various manners by variously combining the avatar's first exposed unit and/or second exposed unit.

When the avatar modification process is finished, the avatar controller 115 stores a new avatar, which includes the files for the first exposed unit and the second exposed unit to which the modifying variable is selectively applied according to the user selection, into the provision history database 113 in correspondence to the user ID. Therefore, the avatar to which the modifying variable is applied is provided and displayed subsequently in steps S290 and S300.

When the user requests a mini homepage storage, the recorder 126 of the service providing server 120 stores information on the mini homepage to which the modified avatar is applied in the contents database 127. Therefore, the mini homepage and the corresponding avatar can be displayed without referring to the database caused by communication with the avatar providing server 110.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. For example, the above-described exemplary embodiments are applicable to an avatar that is provided on a wireless network, such as the wireless Internet, as well as an avatar on the wired Internet.

INDUSTRIAL APPLICABILITY

According to the embodiments of the present invention, the avatar is divided into a plurality of units and exposed units of the avatar are variable according to the user's location on the Internet so that the avatar can be easily displayed on any location on the Internet.

Also, an avatar that can identify the user in linkage with any movement of the user on the Internet can be provided, and hence, the user can express his unique features or senses in any place on the Internet in which a plurality of services is provided.

Further, the avatar is divided into a plurality of units and the units are easily modifiable by the user's selection so that the user can modify the avatar in various manners according to his will.

In addition, when the user modifies the avatar in the community service, the modified avatar related data are stored together with the community related contents so that the contents and the avatar are quickly displayed based on the avatar that is stored when the community related information is provided.

The invention claimed is:

1. A method for providing an avatar, the method comprising:
provinding, using an avatar providing server, the avatar to a user connected to a network through a user terminal in response to a request by the user;
storing information associated with the avatar provided to the user;
receiving, at a service providing server, the information associated with the avatar provided by the avatar providing server to the user, the information associated with the avatar comprising information on a plurality of exposed units configuring the avatar;
determining, using the service providing server, a location of the user in the network;
selecting, using the service providing server, information on exposed units of the avatar of the user depending on the user's location in the network;
transmitting files for a first exposed unit and a second exposed unit if the determining determines a first location and transmitting a file for the first exposed unit, without transmitting a file for the second exposed unit, if the determining determines a second location;
generating, using the service providing server, a service page on which the avatar having an exposed unit is displayed based on the transmitted file or files; and
transmitting the service page to the user terminal,
wherein the location of the user is a page displaying the avatar with an identity (ID) code of the user, wherein the user's access to the first location requires authentication via a first authenticator and the user's access to the second location requires authentication via a second authenticator,
wherein the first exposed unit corresponds to a head of the avatar and the second exposed unit corresponds to parts of the avatar other than the head, and
wherein transmitting the service page comprises:
transmitting, to the user terminal, the service page on which the first exposed unit and the second exposed unit of the avatar are displayed if a web address associated with the user corresponds to a first page; and
transmitting, to the user terminal, the service page on which the first exposed unit of the avatar is displayed, without displaying the second exposed unit, if the web address associated with the user corresponds to a second page.

2. The method of claim 1, further comprising:
providing, using the avatar providing server, an avatar modifying means in response to a request by the user; and
modifying and controlling the plurality of exposed units configuring the avatar according to the user's operation of the avatar modifying means.

3. The method of claim 1, wherein the avatar is displayed with the ID code assigned to the user.

4. A method for providing an avatar, the method comprising:
providing, using an avatar providing server, the avatar to a user connected to a network through a user terminal in response to a request by the user;
storing information associated with the avatar provided to the user;
requesting, using a service providing server, the information from the avatar providing server;
determining, using the avatar providing server, a location of the user in the network;
selecting, using the avatar providing server, information on different exposed units of the avatar of the user depending on the user's location in the network;
transmitting information corresponding to the at least one exposed unit to the service providing server, wherein the transmitting comprises transmitting files for a first exposed unit and a second exposed unit if the determining determines a first location and transmitting a file for the first exposed unit, without transmitting a file for the second exposed unit, if the determining determines a second location;
generating, using the service providing server, a service page on which the avatar having a controlled exposed unit is displayed based on the transmitted file or files; and
transmitting the service page to the user terminal,
wherein the location of the user is a page displaying the avatar with an identity (ID) code of the user, wherein the user's access to the first location requires authentication via a first authenticator and the user's access to the second location requires authentication via a second authenticator,
wherein the first exposed unit corresponds to a head of the avatar and the second exposed unit corresponds to parts of the avatar other than the head, and
wherein transmitting the service page comprises:
transmitting, to the user terminal, the service page on which the first exposed unit and the second exposed unit of the avatar are displayed if a web address associated with the user corresponds to a first page; and
transmitting, to the user terminal, the service page on which the first exposed unit of the avatar is displayed, without displaying the second exposed unit, if the web address associated with the user corresponds to a second page.

5. The method of claim 4, further comprising:
providing, using the avatar providing server, an avatar modifying means in response to a request by the user; and
modifying and controlling the exposed units configuring the avatar according to the user's operation of the avatar modifying means.

6. The method of claim 4, wherein the avatar is displayed with the ID code assigned to the user.

7. A method for providing an avatar, the method comprising:
displaying an avatar provided to a user connected to a network through a user terminal depending on the user's location in the network, the avatar comprising a first exposed unit corresponding to a head of the avatar and a second exposed unit corresponding to parts of the avatar other than the head;
providing an avatar modifying means to the user terminal in response to a request of the user;
determining a location of the user terminal in the network;
determining an operation state of the avatar modifying means, the operation state being controlled by the user;
modifying and controlling the first exposed unit based on a first modifying variable set according to the determined operation state of the avatar modifying means;
modifying and controlling the second exposed unit based on a second modifying variable set according to the determined operation state of the avatar modifying means;
transmitting files for a first exposed unit and a second exposed unit if the determining determines a first location and transmitting a file for the first exposed unit, without transmitting a file for the second exposed unit, if the determining determines a second location;
generating and displaying the avatar by combining the modified and controlled first exposed unit and the modified and controlled second exposed unit if the determining has determined the first location and generating and displaying the avatar by combining the modified and controlled first exposed unit, without the modified and controlled second exposed unit, if the determining has determined the second location; and
transmitting the service page to the user terminal,
wherein the location of the user is a page displaying the avatar with an identity (ID) code of the user, wherein the user's access to the first location requires authentication via a first authenticator and the user's access to the second location requires authentication via a second authenticator,
wherein transmitting the service page comprises:
transmitting, to the user terminal, the service page on which the first exposed unit and the second exposed unit of the avatar are displayed if a web address associated with the user corresponds to a first page; and
transmitting, to the user terminal, the service page on which the first exposed unit of the avatar is displayed, without displaying the second exposed unit, if the web address associated with the user corresponds to a second page.

8. The method of claim 7, wherein the first modifying variable comprises at least one of viewing direction, facial expression, and color, and the second modifying variable comprises at least one of pose and direction.

9. The method of claim 7, wherein displaying the avatar comprises displaying the avatar with the ID code assigned to the user.

10. A non-transitory computer-readable recording medium for storing a program for executing the method of claim 1.

11. A system for providing an avatar, the system comprising:
a provision history database to store information associated with the avatar assigned to a user;
an avatar display to collect the information on the avatar assigned to the user from the provision history database and to display the information in response to connection of the user to a network;
a user position determiner to determine a location of the user in the network, wherein the avatar comprises a plurality of exposed units;
a service providing server for transmitting a service page to the user terminal; and
an avatar providing server to transmit files for a first exposed unit and a second exposed unit if the user position determiner determines a first location and to transmit a file for the first exposed unit, without transmitting a file for the second exposed unit, if the user position determiner determines a second location, and wherein the avatar display differently selects at least one of the plurality of exposed units according to the determined location and displays the at least one exposed unit of the selected avatar,
wherein the location of the user is a page displaying the avatar with an identity (ID) code of the user, wherein the user's access to the first location requires authentication via a first authenticator and the user's access to the second location requires authentication via a second authenticator,
wherein the first exposed unit corresponds to a head of the avatar and the second exposed unit corresponds to parts of the avatar other than the head, and
wherein transmitting the service page comprises:
transmitting, to the user terminal, the service page on which the first exposed unit and the second exposed unit of the avatar are displayed if a web address associated with the user corresponds to a first page; and
transmitting, to the user terminal, the service page on which the first exposed unit of the avatar is displayed, without displaying the second exposed unit, if the web address associated with the user corresponds to a second page.

12. The system of claim 11, further comprising:
a user selecting and determining unit to provide an avatar modifying means and to determine an operation state of the avatar modifying means, the operation state being controlled by the user; and
an avatar controller to modify and control the at least one exposed unit according to the determined operation state.

13. The system of claim 12, further comprising:
an avatar database to store files corresponding to the exposed units of the avatar associated with the ID code, the files comprising at least one sub file for displaying exposed units of the avatar,
wherein the avatar controller selects a modifying variable for the at least one exposed unit of the avatar according to the determined operation state, and modifies and controls the at least one exposed unit of the avatar based on the file corresponding to the modifying variable.

* * * * *